Nov. 1, 1966        M. L. GOSNELL                3,283,143
                      FOG LENS
Filed Nov. 12, 1963                         4 Sheets-Sheet 3
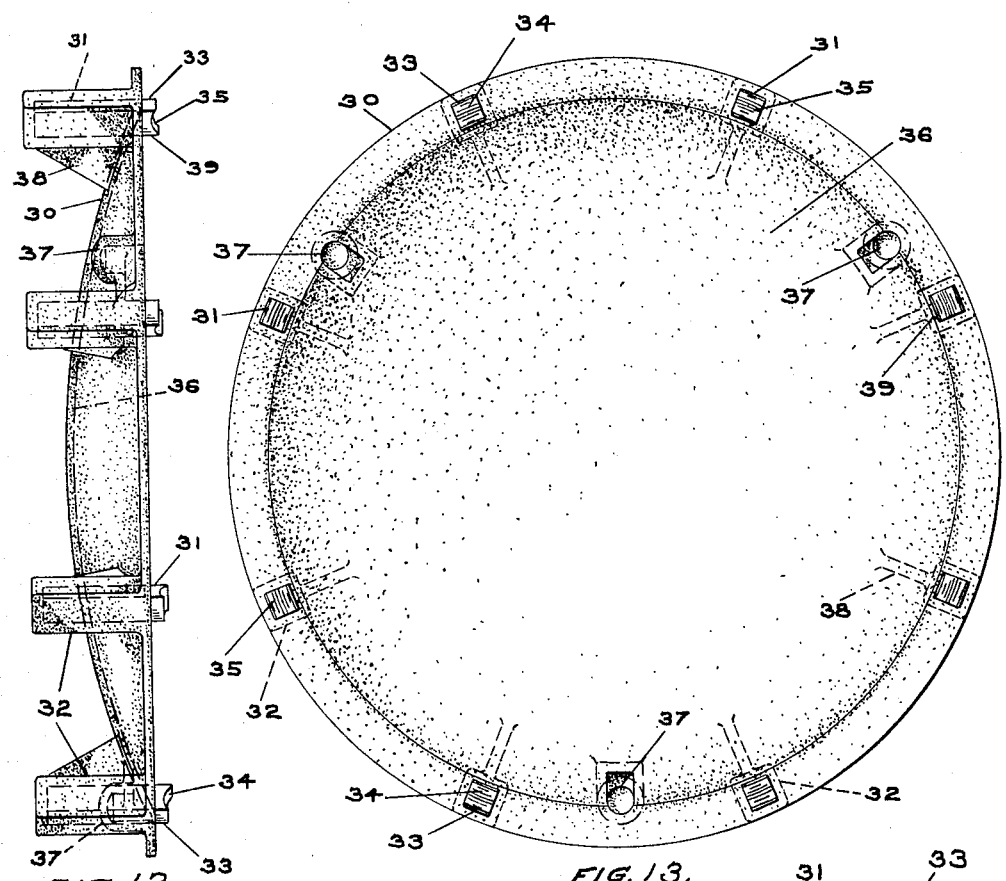
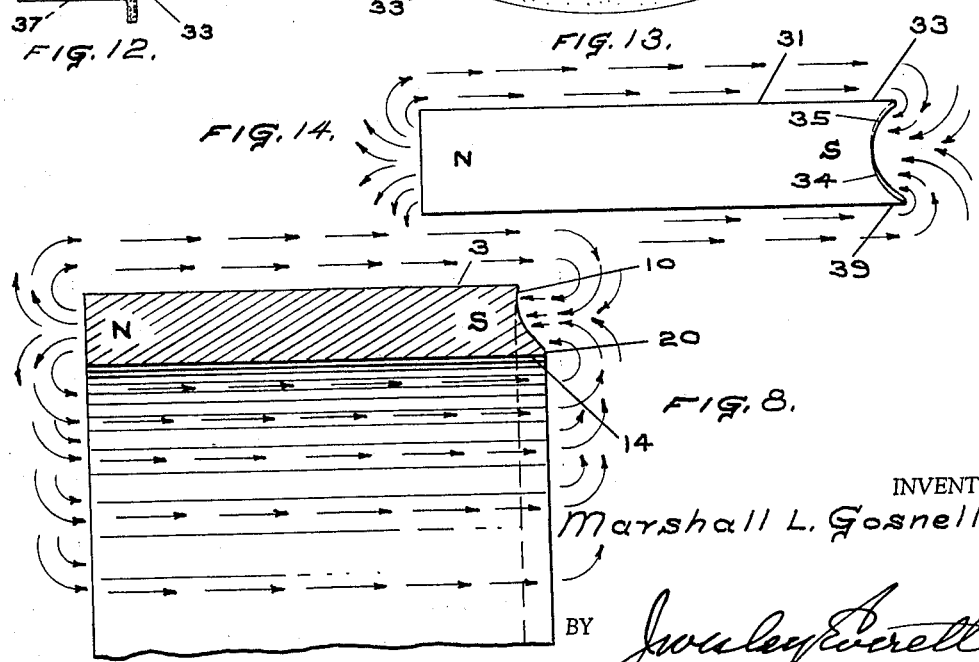
INVENTOR
Marshall L. Gosnell
BY
Jwesley Everett
ATTORNEY Nov. 1, 1966 M. L. GOSNELL 3,283,143
FOG LENS Filed Nov. 12, 1963 4 Sheets-Sheet 4

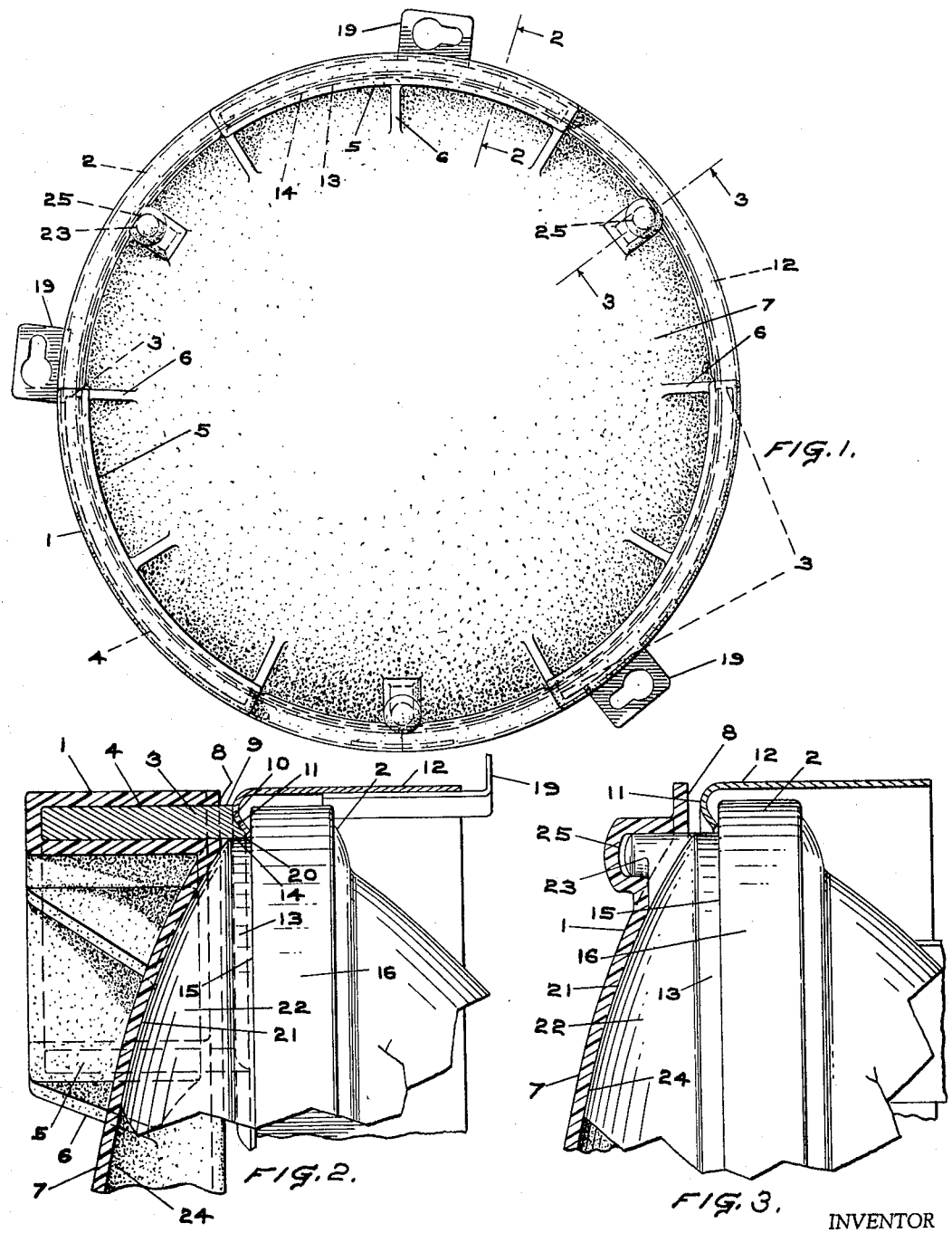

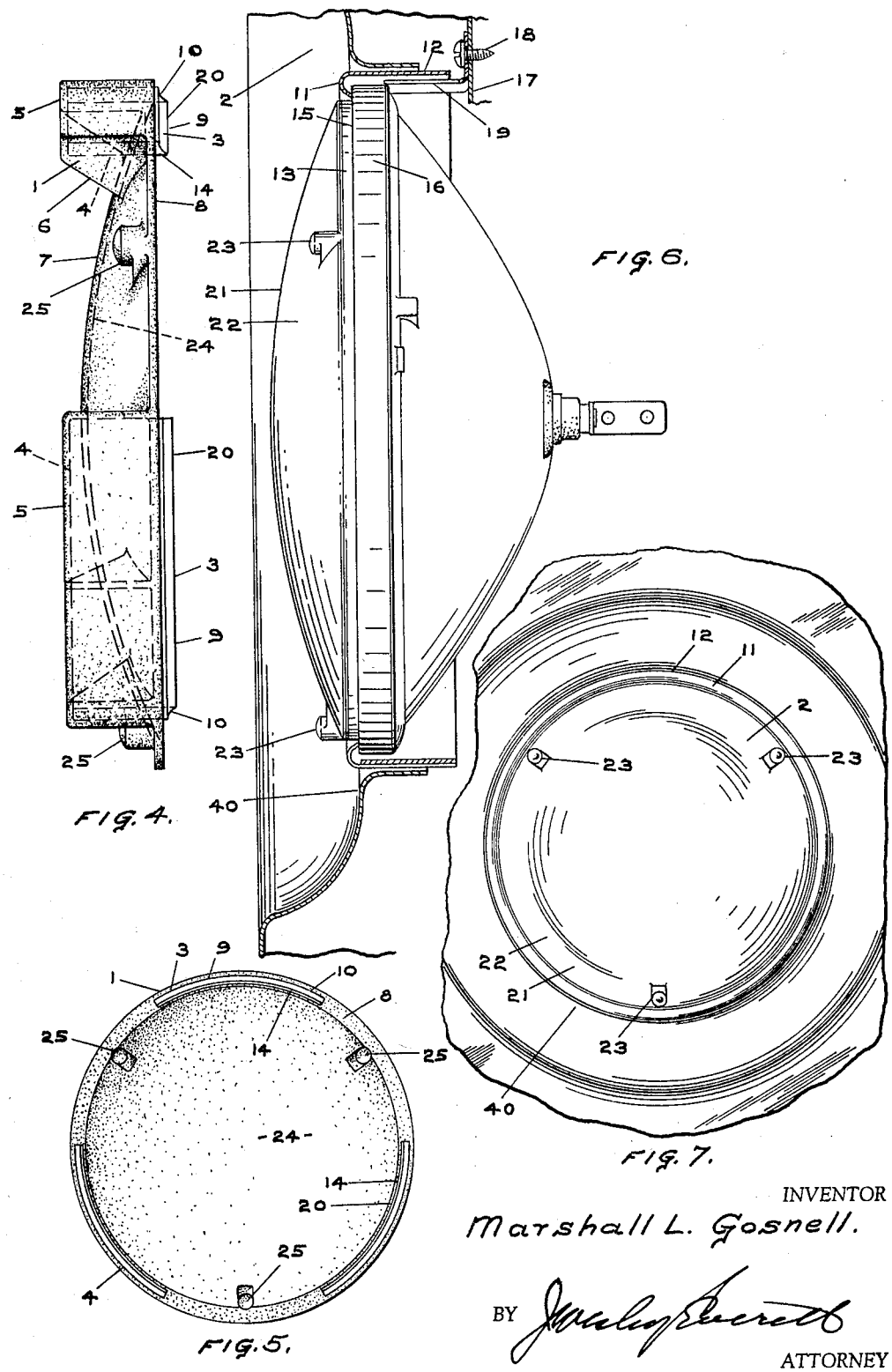

INVENTOR
Marshall L. Gosnell

BY *[signature]*
ATTORNEY

United States Patent Office 3,283,143
Patented Nov. 1, 1966

3,283,143
FOG LENS
Marshall L. Gosnell, 1222 Circle Drive, Baltimore, Md.
Filed Nov. 12, 1963, Ser. No. 322,855
4 Claims. (Cl. 240—46.57)

The present invention relates to improvements in fog lenses, particularly of the type used as accessories to headlight assemblies and having the characteristics of a convenient attachment and detachment from normal operating position with the headlight assembly.

These lenses may be of an amber color or any convenient hue or color tint for purposes of increasing the fog penetrating characteristics of the colored lens and reduce the back reflecting glare of the headlight to a minimum.

Without an efficiently operating fog lens, the naked white glaring light from a headlight under fog conditions bounces and reflects back from a comparatively short distance from the light source thereby creating a counteracting glare to the eyes of the driver and producing a hazardous driving condition.

This back glare of white light under fog conditions is due primarily to the reflecting characteristics of the minute globules of moisture or water suspended in the air and producing the fog condition. A similar adverse glare effect is produced by fairly dense rain due to the white light being reflected back from the concentrated rain droplets.

It is the purpose of the present invention to filter this white light by the use of a substantially translucent fog lens of preferably amber hue and having means and conformation for holding the lens to the headlight in normal operating position by combination novel magnetic means and conformation of the fog lens to knobs or projections on the lens of the headlight proper to prevent lateral or rotative movement of the fog lens when the same is in normal operative position and engagement with the headlight assembly.

Another purpose of the present invention is to provide lensholding magnets of a design whereby the assembly contacting surfaces of the magnets are adapted to conform with the conformation of the assembly at the area of magnetic holding contact for purposes of increasing the area of contact by the conformation of said elements to make the magnets more effective and to prevent shifting and sliding of the fog lens in relation to the headlight lens proper.

Another purpose and object of the present invention is to provide relatively flat elongated curved magnets fixedly engaged to the fog lens having an elongated concaved exposed edge for magnetically contacting a portion of the headlight assembly, the curvature of the magnet and its concave assembly contacting surface conforming to the curvature and convexity of the light retainer ring at the area of contact with the ring. To increase the effectiveness of this elongated flat magnet the magnetic forces move in a direction transverse to its length and parallel to the wide sides thereof whereby magnetic pull takes place all along its elongated curved concave edge.

With these and other objects and purposes in view, together with important details pertaining thereto, which will appear as the present invention is fully described and claimed, the invention consists in the construction, combination and general arrangement of parts relating thereto.

In the accompanying drawings I have illustrated my invention in its preferred form together with a modified form thereof, however it is understood various elemental changes may be made without departing from the spirit of the invention.

In the drawings:

FIGURE 1 is a front elevational view of the preferred form of my invention showing the fog lens with elongated arcual magnets in relation to the headlight and retainer ring therefor.

FIGURE 2 is a fragmentary sectional view taken on the line 2—2 of FIGURE 1.

FIGURE 3 is a fragmentary sectional view taken on the line 3—3 of FIGURE 1.

FIGURE 4 is a side elevational view of my preferred form of fog lens shown in exploded relation to FIGURE 6.

FIGURE 5 is a rear elevation of the same on a reduced scale.

FIGURE 6 is a fragmentary sectional view in side elevation of a sealed beam type of headlight assembly together with its retainer ring and trim structure.

FIGURE 7 is a fragmentary front elevational view on a reduced scale of FIGURE 6.

FIGURE 8 is a fragmentary sectional view, somewhat diagrammatic, of the elongated arcual magnet of my preferred form of invention, illustrating the lines of magnetic force moving in a direction transverse to the length of the magnet.

FIGURE 12 is a side elevational view of my modified form of fog lens.

FIGURE 13 is a rear elevational view of the same.

FIGURE 14 is a side elevational view, somewhat diagrammatic, of my modified form of magnet, illustrating the lines of magnetic force in relation to the magnet.

Figure 9:
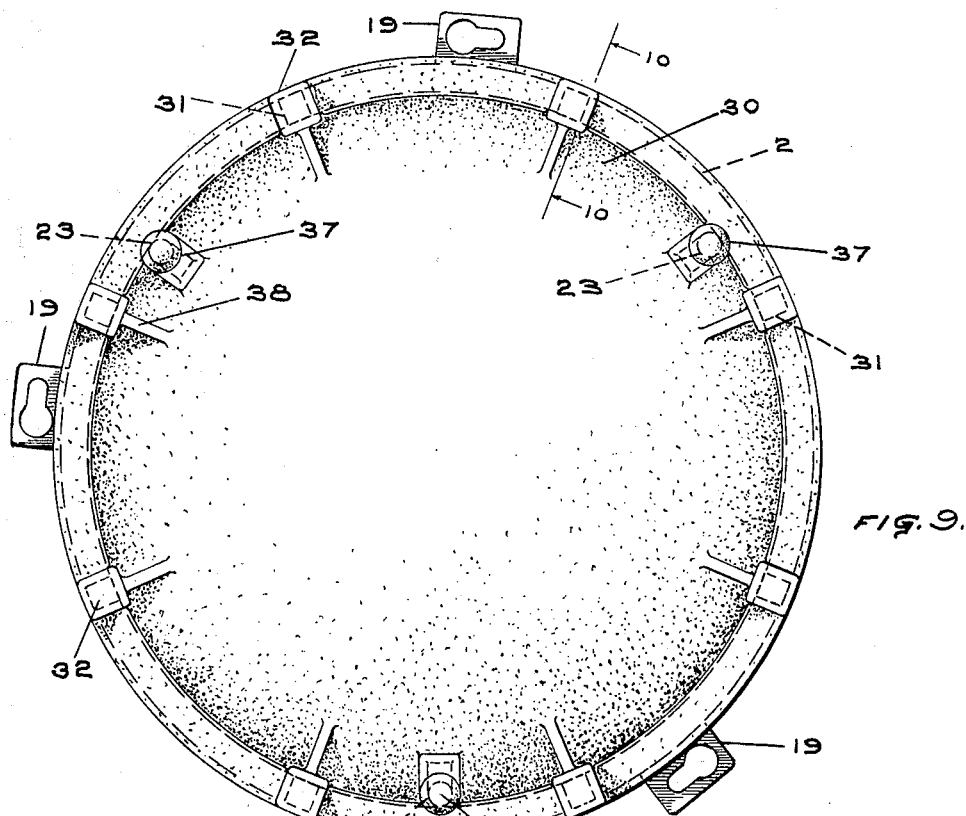
FIGURE 9 is a front elevational view of my modified form of fog lens, its magnets and in relation to the headlight and retainer ring therefor.

Referring to the drawings by reference numerals, each of which represents the same or similar parts throughout the various views and with particular reference to FIGURES 1 to 8 relating to the preferred form of my improved form of fog lens. The invention consists of a fog lens 1, preferably made of an amber colored plastic in the present instance for purposes of filtering out intense white light, and a headlight assembly 2, to the structure of which the present fog lens 1 is adapted to be held by elongated arcual magnets 3, fixedly positioned and encased in the plastic of the fog lens at the front and peripheral area thereof for a greater portion of their body structure as shown at 4, particularly in FIGURES 2 and 4 of the drawings. To this end the fog lens is provided with forwardly disposed curved segmental housing structures 5, formed integral with the fog lens 1, for securely holding and supporting the elongated arcual magnets 3. In view of the overhang of the housings 5, strengthening ribs 6 are provided between the underside of the housings and the outer convex surface 7 of the fog lens as shown.

A small portion of the curved magnets 3 extends from the rear face 8 of the fog lens 1, providing exposed magnet extensions 9, these extensions terminate in a narrow arcuately disposed concave rear edge face 10. These concave rear edge faces 10 engage magnetically with the rolled edge 11 of the headlight retainer ring 12, this rolled edge faces forward and is convex in shape and conforms with the concavity of the face of the rear edge 10 of the magnets 3, thereby providing substantially matched contacting surfaces for the full length of each of the elongated magnets 3 and the exposed rolled edge 11 of the headlight retainer ring 12 for the purpose of increasing the effectiveness of the magnetic pull between these members when in engagement.

It will be noted in FIGURES 2, 3 and 6 the headlight member 2 is provided with a peripheral shoulder 13 that provides a circumferential support for the underside or inner face 14 of the magnet projections or extensions 9.

The vertical face 15 of the headlight ring structure 16 provides a circumferential abutment for the retainer ring rolled edge structure 11. This ring 11 is in turn fastened to a rigid fixed portion 17 of the assembly indicated fragmentarily by means of the fastening screws 18 and ring extensions or brackets 19. In this respect it will be noted, particularly in FIGURE 2 of the drawing that the inner ends of the arcual magnets 3 fit snugly between the shoulder 13 and the rolled edge 11 due to the inner face 14 and the concave face of the rear edge 10 of the magnets 3 converging to a substantially narrow edge 20. This presents a dependable positive anchor structure to prevent shifting between the fog lens 1 and the outer convex surface 21 of the headlight lens 22.

The outer convex lens surface 21 of the headlight 2 is provided with knobs 23 or short extensions formed integral with the lens structure and located at the peripheral area of the lens surface 21. The distribution of these knobs over the said lens surface is not uniform as to the distance between the knobs. This irregularity in association with the fog lens proper will be hereinafter described.

The inner concave surface 24 of the fog lens is provided with sockets 25 that register as to their location and spacing with that of the knobs 23 and the concavity 24 of the fog lens is similar in shape and size to the convex surface 21 of the light lens 22. This similarity in size and shape of these elements of the fog lens and the headlight lens provides a matched engagement between these members. In this respect, as will be noted in FIGURE 3, the sockets 25 snugly fit the knobs 23, except as to their ends, for the purpose of providing additional means of interengagement between the fog lens and the light lens to prevent displacement or shifting of the fog lens from normal operative position. Thus these elements have almost total conformation one with the other in this respect for the above referred to purpose. The relatively long arcual magnetic pull of the magnet 3 together with the substantially matched interengagement of these elements prevents the separation of the fog lens from the light, except by a direct pull on the part of the user when it is desirable to remove the fog lens from the light assembly proper.

Referring to the unequal spacing or distribution of the knobs 23 and the sockets 25 of the headlight lens 22 and fog lens 1 respectively it may be readily seen from FIGURES 1, 5 and 7 that the distance from the bottom knob 23 and socket 25 from either one of the two upper sets of these elements is greater than the distance between the two top sets of these elements. With this arrangement of the knobs and their respective sockets it may be seen the fog lens can be mounted to the headlight lens only one way for proper registration of the said elements. This is advantageous when it is desired to have a special filtering design on the face of the fog lens to match up with and operate in conjunction with a light reflecting design identified with the headlight lens.

Figures 10, 11:
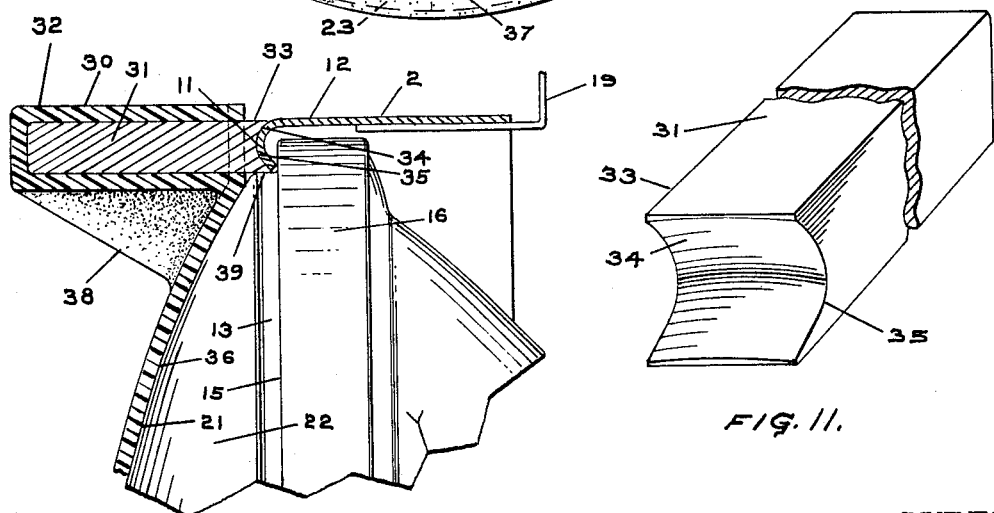
FIGURE 10 is a fragmentary sectional view taken on the line 10—10 of FIGURE 9.
FIGURE 11 is a detailed fragmentary perspective view of one of the magnets used in my modified form of fog lens illustrating the two way curvature of the end structure of the magnet.

Referring to the modified form of the invention as shown in FIGURES 9 to 14 the modified fog lens 30 is shown identified with the headlight assembly 2, this assembly has the same structural features and reference numerals as those associated with the preferred form of the invention.

In this instance the lens 30 is preferably made of a colored plastic such as amber or the like for purposes of filtering out the white glare of headlights and the like as and for the purpose as hereinbefore described for the function of the preferred form of fog lens.

For purposes of magnetically engaging the lens 30 to the rolled edge 11 of the headlight retainer ring 12 the lens is provided with a plurality of somewhat elongated magnets 31, distributed and fixedly held in and supported by the forwardly directed integral housing extensions 32 of the lens structure about the periphery thereof as fully shown in the drawings. These magnets 31 are preferably square in cross section in the present instance. The inner exposed ends 33 of the magnets 31 engage the curved face of the rolled edge 11 of the retainer ring 12. To this end and for purposes of obtaining substantially full contact by conformation of the end face 34 of the magnets with the curved face 11 of the retainer ring 12 the end face 34 is provided with a double curvature concave surface 35 adapted to both the curvature of the rolled edge 11 and the circumferential curve of the retainer ring 12.

The inner concave surface 36 of the fog lens 30 is provided with sockets 37 to receive and have a fitting engagement with the knobs 23 projecting from the headlight lens surface 21 in a similar manner as and for the purpose as hereinbefore described for the preferred form of fog lens 1.

For purposes of giving strength and reinforcement to the housing structures 32 for the magnets 31, ribs 38 are provided as shown.

The inner faces 39 of the magnets 31 in the present instance also engage the shoulder 13 for positive positioning and anchoring purposes to prevent shifting and slippage of the fog lens in relation to the headlight assembly.

It is understood magnets of the necessary contacting face conformation could be magnetically engaged to the trim 40 of the headlight assembly 2 without departing from the broad aspects of the invention.

I have thus described my invention specifically and in detail, in order that its nature and operation together with its construction may be fully understood; however the specific terms herein are used descriptively rather than in a limiting sense, and the scope of the invention is defined in the claims.

What I claim and desire to secure by Letters Patent is:
1. A fog lens accessory in combination with a headlight assembly, said assembly comprising a headlight lamp member and a retainer ring engaging the periphery thereof, magnetic means for removably attaching the lens in operative position to the headlight assembly comprising elongated arcual shaped magnets having magnetic forces moving in a direction transverse to and throughout the length of the said magnets, the magnets being fixedly engaged to the lens and having substantially arcual conforming and magnetic engagement throughout their length with the retainer ring at the area of contact between the arcual shaped magnets and the retainer ring.

2. A fog lens accessory in combination with a headlight assembly, the assembly comprising a headlight lamp member having a lens structure with an outer convex lens surface, said surface comprising a plurality of projections formed integral therewith, the said fog lens having an inner concave surface conforming to the convex lens surface of the headlight lamp proper and having means for interengagement with the projections, said interengagement means preventing lateral displacement of the fog lens with respect to the headlight lamp lens when said fog lens is in normal operative position with the headlight lens, the fog lens having means for magnetically engaging a portion of the assembly for purposes of holding the fog lens in operative position to the assembly, said means comprising elongated arcual shaped magnets having magnetic forces moving in a direction transverse to and throughout the length of the said magnets.

3. The outer convex surface of the headlight lamp lens of claim 2 terminating in a peripheral and circumferential shoulder, the plane of which is parallel to the axis of the headlight lamp, the said magnetic means comprising a plurality of magnets fixedly engaged to a peripheral edge structure of the fog lens, and having a portion of each of the magnets extending from the rear face of the fog lens said extensions having engagement with the said circumferential shoulder for purposes of preventing lateral displacement of the fog lens from normal operating position.

4. A fog lens accessory in combination with a headlight assembly, said assembly comprising a headlight lamp member and a retainer ring engaging the periphery thereof, said retainer ring having a headlight lamp engaging peripheral rolled edged structure, means for removably attaching the fog lens in operative position to the headlight assembly comprising a plurality of magnets located in juxta-position to the periphery of the fog lens and fixedly engaged thereto and having magnetic and concentric mechanical engagement with the peripheral rolled edge of the retainer ring, the headlight lamp proper comprising a lens structure having an outer convex lens surface with a plurality of projections formed integral therewith, the said fog lens having an inner concave surface adapted to conform to the said outer convex lens surface and the said projections, the magnets having outer and inner end surfaces, the inner end surfaces being partially concave, the rolled edge portion of the retainer ring having an outside exposed partially convex surface, the said concave and convex surfaces being substantially similar in outline and conforming with each other thereby providing means for substantially mutual and matched contact between the said respective magnet ends and the rolled edge portion of the retainer ring for increasing the holding effectiveness of the magnets to a curved surface when the fog lens is in normal operative engagement with the headlight assembly.

References Cited by the Examiner

UNITED STATES PATENTS

| | | | |
|---|---|---|---|
| 2,147,482 | 2/1939 | Butler | 240—52.15 X |
| 2,349,042 | 5/1944 | Holmes | 240—46.53 |
| 2,539,819 | 1/1951 | Dominick | 240—46.59 |
| 2,734,129 | 2/1956 | Kahla | 240—46.49 |
| 2,979,601 | 4/1961 | McClees | 240—46.59 X |
| 3,191,025 | 6/1965 | Harker | 240—46.59 X |

NORTON ANSHER, *Primary Examiner.*

C. R. RHODES, *Assistant Examiner.*